United States Patent [19]
Iwai et al.

[11] Patent Number: 5,644,913
[45] Date of Patent: Jul. 8, 1997

[54] HEATING SYSTEM FOR CATALYTIC CONVERTER

[75] Inventors: Nobuo Iwai; Seiji Hayashi; Motoaki Akai, all of Tsukuba, Japan

[73] Assignee: Ministry of International Trade and Industry, Agency of Industrial Science and Technology, Tokyo, Japan

[21] Appl. No.: 569,938

[22] Filed: Dec. 8, 1995

[30] Foreign Application Priority Data

Dec. 19, 1994 [JP] Japan ................... 6-333763

[51] Int. Cl.⁶ .................................................. F01N 3/36
[52] U.S. Cl. ................................. 60/284; 60/285; 60/286
[58] Field of Search ............................... 60/284, 285, 286

[56] References Cited

U.S. PATENT DOCUMENTS

| | | | |
|---|---|---|---|
| 4,165,610 | 8/1979 | Iizuka et al. | |
| 4,256,074 | 3/1981 | Sugasawa et al. | 60/301 |
| 4,263,782 | 4/1981 | Matsumoto et al. | 60/301 |
| 4,452,040 | 6/1984 | Kobashi | 60/286 |
| 4,467,602 | 8/1984 | Lizuka et al. | 60/301 |
| 4,887,426 | 12/1989 | Goerlich | 60/286 |
| 5,044,158 | 9/1991 | Goerlich | 60/286 |
| 5,207,058 | 5/1993 | Sasaki et al. | |

FOREIGN PATENT DOCUMENTS

| | | |
|---|---|---|
| 2 163 537 | 7/1973 | Germany . |
| 1 493 308 | 11/1977 | United Kingdom . |

*Primary Examiner*—John T. Kwon
*Attorney, Agent, or Firm*—Oblon, Spivak, McClelland, Maier & Neustadt, P.C.

[57] ABSTRACT

A heating system for a catalytic converter of a multi-cylinder, spark-ignition engine is provided. Half of the cylinders of the engine, for example, the cylinder #2 and the cylinder #3, are operated on a rich gas mixture with an excess air ratio of 0.6 or less to produce a combustible gas mixture comprising hydrogen, carbon monoxide, and unburned fuel components, while the remaining half of the cylinders, for example, the cylinder #1 and the cylinder #4, are utilized as air blowers to which no fuel is fed. The flammable gas mixture produced from the combustible gas produced in the cylinder #2 and the cylinder #3 and the air supplied by the cylinder #1 and the cylinder #4 is burned in the combustor equipped with an ignition device which is installed upstream from the catalytic converter to provide heat energy to activate the catalyst. The system can rapidly heat and activate the catalyst without requiring a special fuel supply system and air blower.

1 Claim, 1 Drawing Sheet

HEATING SYSTEM FOR CATALYTIC CONVERTER

BACKGROUND OF THE INVENTION

1. Field of the Invention

The present invention relates to a heating system used in a catalytic converter for a multi-cylinder, spark-ignition engine, and more particularly to a heating system for a catalytic converter which rapidly heats and activates the catalyst during the warm-up period of an engine cold start without requiring a special fuel supply system and air blower for heating the catalyst.

2. Discussion of the Background

Various rapid heating systems for the catalysts in catalytic converters for exhaust gas from internal combustion engines have been proposed, accompanying the enforcement of regulations for exhaust gas. One of these systems has an exhaust gas combustor installed upstream from the catalyst. Fuel is injected into the combustor to generate heat energy to rapidly heat the catalyst.

This conventional system requires a fuel supply unit with a fuel injector through which the fuel is fed to the exhaust gas combustor. In addition, a separate air blower is required to supply air to the exhaust gas combustor. The requirement for these units pose serious problems in terms of cost and reliability.

The object of the present invention is to provide a heating system which can rapidly heat the catalyst in the catalytic converter without requiring a separate fuel supply unit and an air blower, thereby ensuring a less-polluting exhaust gas emission from internal combustion engines.

SUMMARY OF THE INVENTION

This object of the present invention is achieved by the provision of heating system for a catalytic converter comprising:

a multi-cylinder, spark-ignition engine, a combustor provided with an ignition means which is installed downstream from the exhaust gas manifold of the engine and upstream from a catalytic converter, and a controller which controls the operation of the multi-cylinder, spark ignition engine so that, up to the point where the catalyst in the catalytic converter is sufficiently activated to convert the exhaust gas from the engine half of the cylinders are operated on a rich gas mixture with an excess air ratio of 0.6 or less to produce a combustible gas mixture comprising hydrogen, carbon monoxide, and unburned fuel components and the remaining half of the cylinders are operated to feed air, thereby producing a flammable gas mixture including said combustible gas mixture and the air, the flammable gas mixture being burned in said combustor to provide heat energy to activate the catalyst, and after the catalyst has been activated all cylinders are operated in a normal manner.

Other objects, features and advantages of the invention will hereinafter become more readily apparent from the following description.

DETAILED DESCRIPTION OF THE PREFERRED EMBODIMENTS

Figure 1:
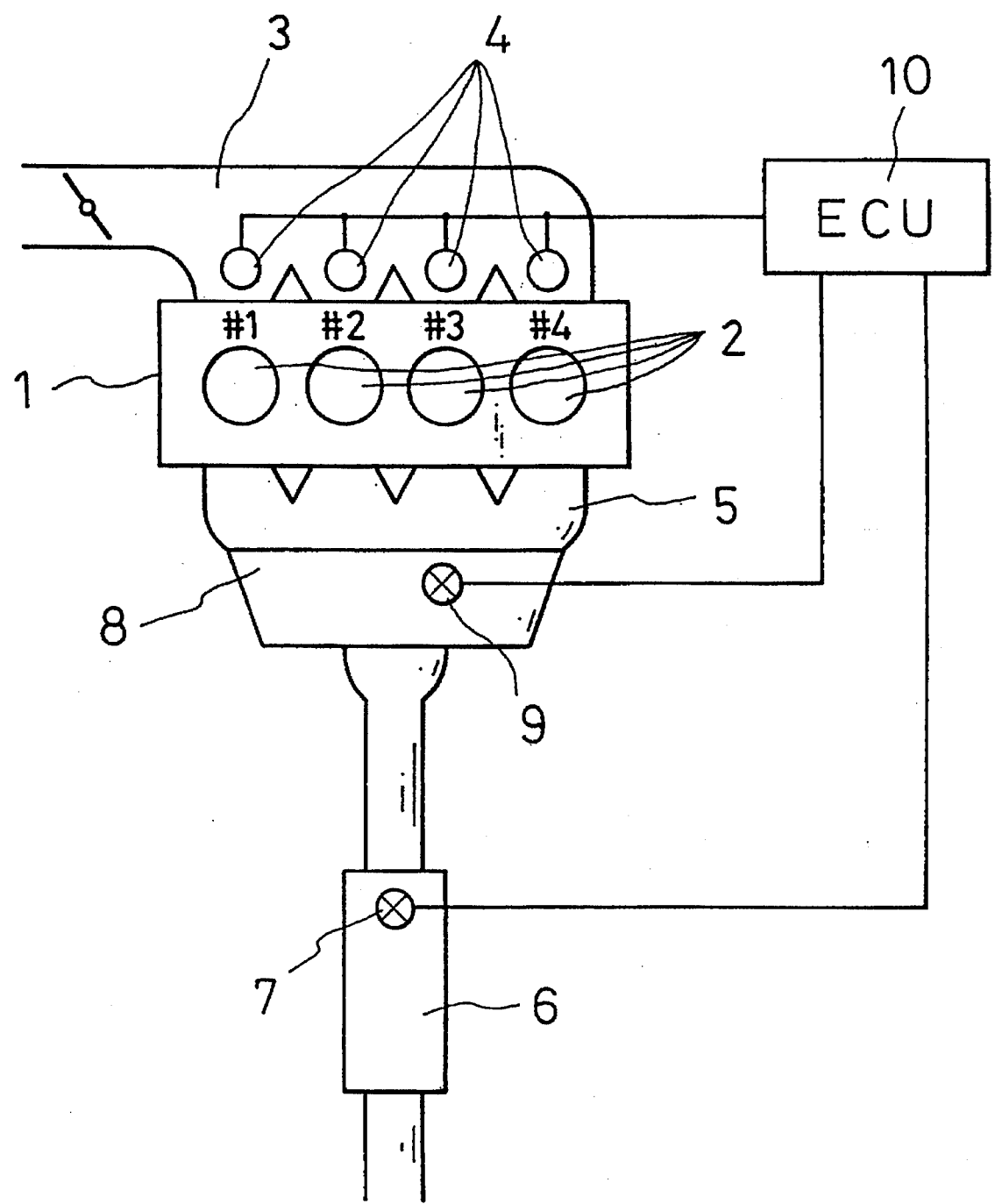
FIG. 1 is a drawing diagrammatically showing the construction of the heating system of the present invention.

By means of the above-described heating system of the present invention half of the cylinders in a multi-cylinder, spark ignition engine are operated on a rich gas mixture with an excess air ratio of 0.6 or smaller to produce a combustible gas mixture comprising hydrogen, carbon monoxide, and unburned fuel components, while the remaining half of the cylinders are utilized as air blowers to which no fuel is fed. This operation ensures production of a flammable mixture in the combustor which is installed upstream from the catalytic converter for the exhaust gas. In this manner the catalyst is rapidly heated without requiring a separate fuel supply unit and air blowers.

An embodiment of the present invention will be described with reference to FIG. 1 showing the construction of the heating system of the present invention. A multi-cylinder, spark ignition engine 1 has four cylinders, #1 to #4, which are indicated by the numeral 3. The cylinders have an air-intake manifold 2 to introduce air therein and fuel injectors 4 through which fuel is injected. The exhaust gas exits the cylinders through an exhaust gas manifold 5 and is sent to a catalytic converter 6, where the noxious components in the exhaust gas are catalytically converted into clean gas. A temperature sensor 7 is installed in the catalytic converter which detects the temperature of the catalyst and transmits the detected temperature to the engine control unit 10 for controlling the operation of the fuel injectors 4.

A combustor 8 equipped with an ignition means 9, such as a spark plug, is installed upstream from the catalytic converter 6. During the warm-up period after a cold start, the engine control unit 10 controls the fuel injectors 4 so that fuel is fed to half the cylinders, for example, the cylinder #2 and the cylinder #3 or the cylinder #1 and the cylinder #4, to produce a rich gas mixture with an excess air ratio of 0.6 or less, while no fuel is fed to the remaining cylinders, that is, the cylinder #1 and the cylinder #4 or the cylinder #2 and the cylinder #3.

Illustrating the operation for the case where the fuel is fed to the cylinder #2 and the cylinder #3, and not to the cylinder #1 and the cylinder #4, as an example, the excess air ratio of a rich gas mixture in the cylinder #2 and the cylinder #3 is maintained at 0.6 or less, while the cylinder #1 and the cylinder #4 function as air blowers.

A combustible gas mixture is produced in the cylinder #2 and the cylinder #3 by the combustion of the rich gas mixture and discharged to the exhaust gas manifold 5. The combustion gas mixture is then sent to the combustor 8 which is located immediately below the exhaust gas manifold 5, where the combustible gas mixture is mixed with the air supplied by the cylinder #1 and the cylinder #4 to produce a flammable mixture. This flammable mixture is ignited and burned in the combustor 8 by the ignition means 9 to produce heat energy which rapidly heats the catalyst in the catalyst converter 6.

While the flammable mixture is burned in the combustor 8, the engine control unit controls the quantity of fuel supplied to the fuel injectors 4 for the cylinder #2 and the cylinder #3 so that the excess air ratio of the flammable mixture in the combustor 8 is maintained preferably at 1.0 or more. Emission of carbon monoxide and unburned fuel should be minimized by maintaining this oxidative atmosphere.

The catalyst in the catalytic converter 6 has been confirmed by experiment to be rapidly heated to a temperature of 400° C. within 20 seconds after a cold start. This temperature of the catalyst is measured by the temperature sensor 7 installed in the catalyst bed. Upon completion of rapid heating of the catalyst, the quantity of fuel supplied to the cylinder #2 and the cylinder #3 through the fuel injectors 4 is restored to the quantity for normal operation via instruction from the engine control unit 8 and, at the same time, the quantity of fuel for normal operation is also supplied to the cylinder #1 and the cylinder #4, which function as air blowers.

In order to burn the flammable mixture in the combustor 8, the concentration of the combustible gas mixture comprising hydrogen, carbon monoxide, and unburned fuel components and the concentration of oxygen should be within a flammable limit. Experiments have proven that among hydrogen, carbon monoxide, and unburned fuel components the hydrogen has the broadest flammable limit, and thus the concentration of hydrogen is most important for igniting the gaseous mixture. It was found that the concentration of hydrogen in the flammable gas mixture should be about 5% or more and that of oxygen about 9% or more.

The concentrations of hydrogen produced by the combustion of flammable mixture are about 10%, 15%, and 20% at the excess air ratios of 0.6, 0.5, and 0.4, respectively. If the combustible mixture with these hydrogen concentrations are diluted with air having an oxygen concentration of 20.6%, the hydrogen concentrations are about 5%, 7.5%, and 10% at the excess air ratios of 0.6, 0.5, and 0.4, respectively, and the oxygen concentration is about 10.3%. These concentrations of both the hydrogen and oxygen are above the flammable limits mentioned above, and thus satisfy the conditions for ignition.

Based on this analysis, by means of the present invention half of the cylinders of the multi-cylinder, spark ignition engine are operated on a rich gas mixture with an excess air ratio of 0.6 or less, and the remaining half of the cylinders are utilized as air blowers to which no fuel is fed. The exhaust gas from the first half the cylinders containing 10% or more hydrogen is thereby diluted with the same volume of air to ensure production of a flammable mixture containing 5% or more hydrogen and 9% or more oxygen.

As illustrated above, by means of the heating system of the present invention half of the cylinders of the multi-cylinder, spark ignition engine are operated on a rich gas mixture with an excess air ratio of 0.6 or less to produce a combustible gas mixture comprising hydrogen, carbon monoxide, and unburned fuel components, while the remaining half of the cylinders are utilized as air blowers to which no fuel is fed. The flammable gas mixture produced from the combustible gas produced in half of the cylinders and the air supplied by the other half of the cylinders is burned in the combustor equipped with an ignition means which is installed upstream from the catalytic converter. This system can rapidly heat the catalyst during the warm-up period at a cold start without requiring a separate fuel supply unit and air blowers, and ensures the remarkable effects of low cost and high reliability.

This application is based on Japanese patent application 333763/1994, filed on Dec. 19, 1994, which is incorporated herein by reference in its entirety.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A heating system for a catalytic converter, the heating system comprising:

a multi-cylinder, spark-ignition engine having a plurality of cylinders;

a combustor provided with an ignition means which is installed downstream from an exhaust gas manifold of the engine and upstream from a catalytic converter; and a controller which controls an operation of the multi-cylinder, spark ignition engine so that, up to a point where a catalyst in the catalytic converter is activated to convert exhaust gas from the engine, half of the cylinders of the plurality of cylinders are operated on a rich gas mixture with an excess air ratio of 0.6 or less to produce a combustible gaseous mixture comprising hydrogen, carbon monoxide, and unburned fuel components, the combustible gaseous mixture being sent to the combustor, and the remaining half of the cylinders of the plurality of cylinder are operated to feed air to the combustible gaseous mixture in the combustor, to produce a flammable gas mixture including said gaseous mixture and the air, the flammable gas mixture being burned in said combustor by ignition of said ignition means to provide heat energy to activate the catalyst during a warm up period after a cold start of the engine, and after the catalyst has been activated all cylinders are operated in a normal manner.

* * * * *